Sept. 6, 1949.　　　　R. SWARTLEY　　　2,481,258
DEVICE FOR TAPPING BEER BARRELS
Filed Oct. 20, 1947　　　　　　　　　2 Sheets-Sheet 1
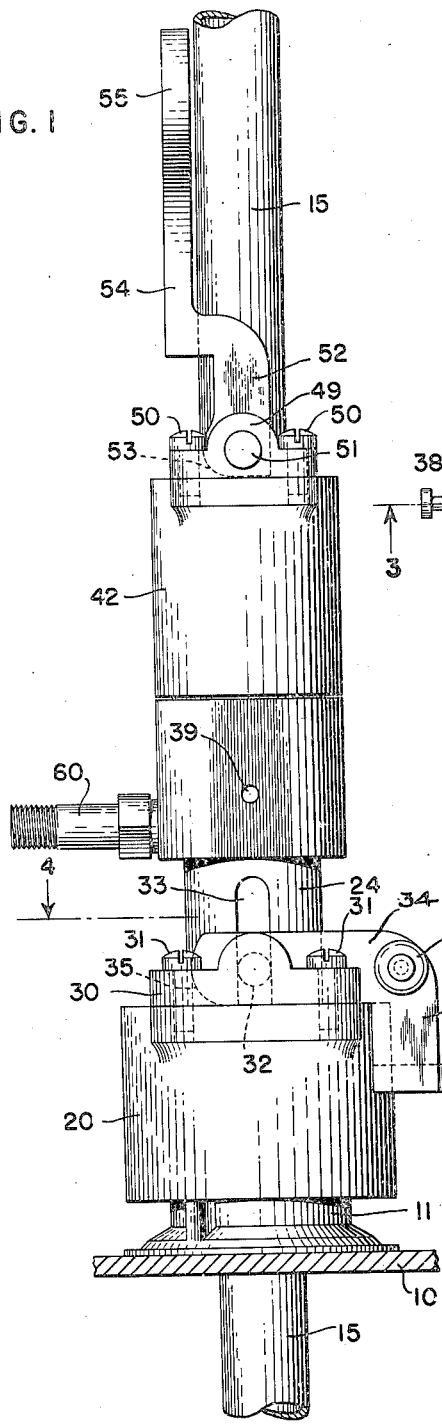
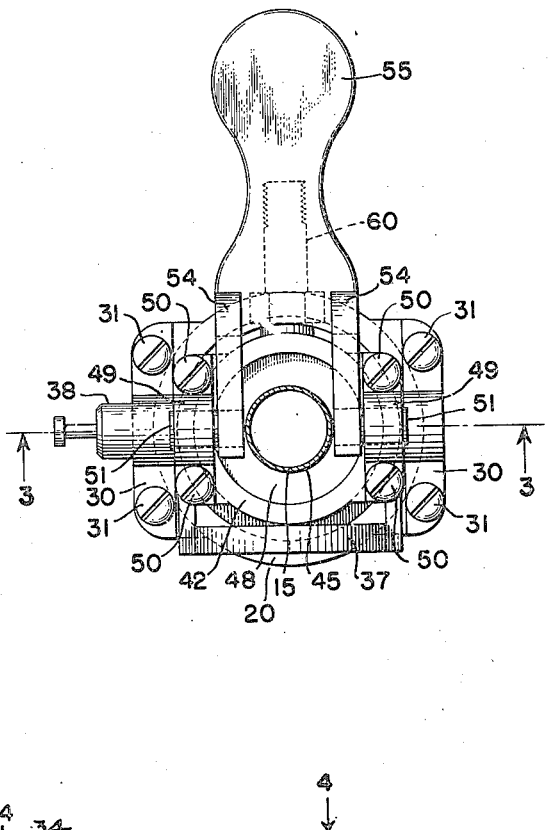
*INVENTOR.*
ROBERT SWARTLEY
BY
ATTORNEY.

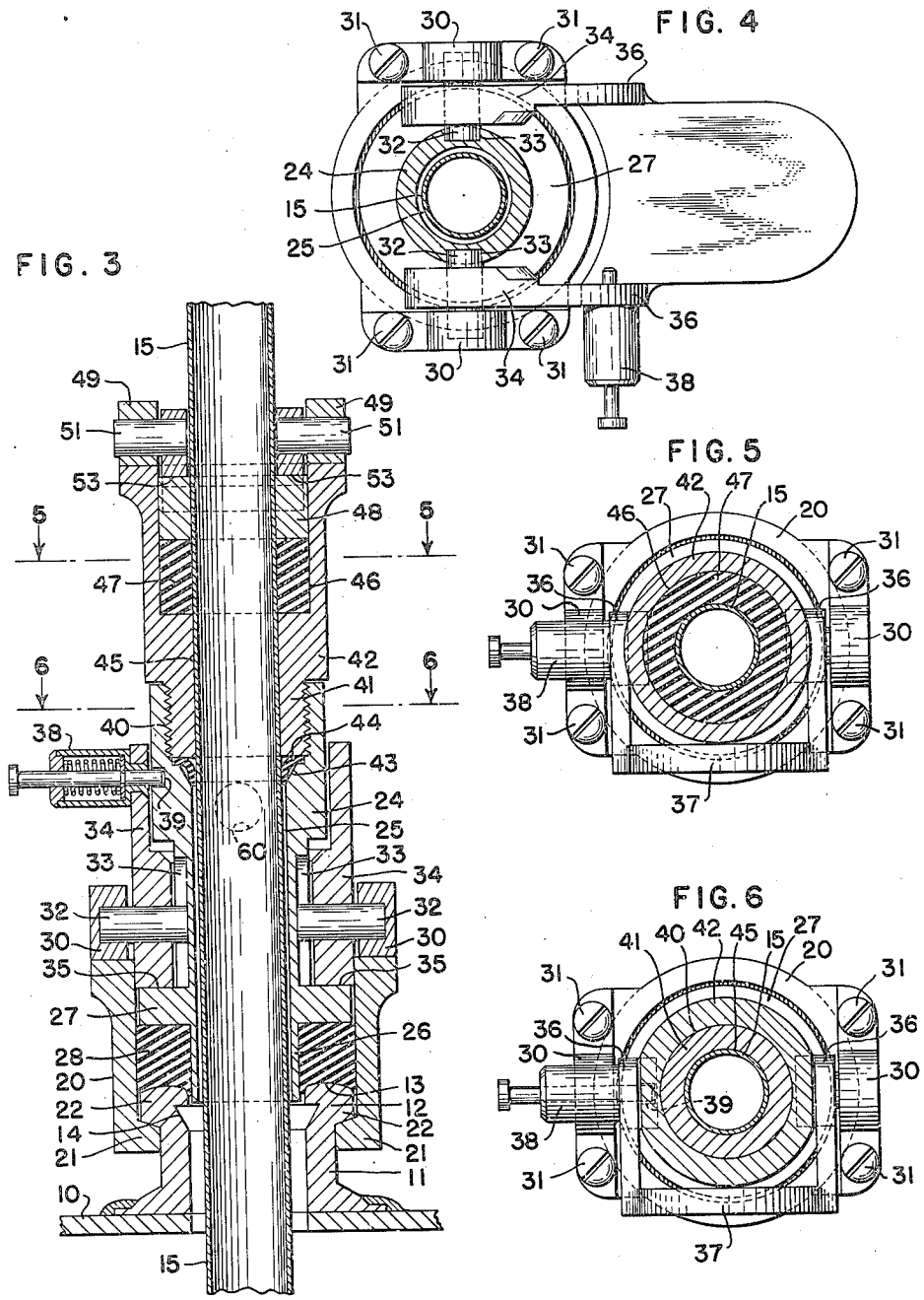

UNITED STATES PATENT OFFICE 2,481,258

DEVICE FOR TAPPING BEER BARRELS

Robert Swartley, Willow Grove, Pa.

Application October 20, 1947, Serial No. 780,923

8 Claims. (Cl. 285—40)

This invention relates to devices for tapping beer barrels.

Various devices have heretofore been proposed for attachment to the bung of a barrel and through which a draft tube is adapted to be inserted for the withdrawing of the fluid from the barrel.

In most of the devices heretofore proposed, the sealing members which were required for preventing fluid leakage were tightened by relative rotation of the members in which the sealing members were carried. The character of the seal was thus determined entirely by the extent to which sealing members were tightened, with the result that imperfect seals were frequently obtained. In other instances, the sealing members were tightened to an extent such that the same were displaced or even ruptured, with consequent waste of the liquid and with unsatisfactory delivery.

In accordance with the present invention, a barrel tapping device is provided, adapted for use on bung closures now available, which is simple to operate and which provides a reliable seal.

It is a further object of the present invention to provide, in a device of the character aforesaid, improved structure for compressing the sealing rings in fluid tight relationship.

It is a further object of the present invention to provide a device of the character aforesaid which is simple but sturdy in construction and capable of withstanding the severe character of use to which devices of this kind are subjected.

It is a further object of the present invention to provide a device of the character aforesaid in which a plurality of seals are provided and in which the compression of the sealing rings is controlled in an improved manner.

It is a further object of the present invention to provide a device of the character aforesaid in which the sealed condition will be indicated by inspection of the device.

Other objects and advantageous features of the invention will be apparent from the specification and claims.

The nature and characteristic features of the invention will be more readily understood from the following description, taken in connection with the accompanying drawings forming part hereof, in which:

Figure 1 is a side elevational view showing a barrel tapping device in accordance with the present invention;

Fig. 2 is a top plan view thereof;

Fig. 3 is a vertical sectional view taken approximately on the line 3—3 of Fig. 2;

Fig. 4 is a horizontal sectional view taken approximately on the line 4—4 of Fig. 1;

Fig. 5 is a horizontal sectional view taken approximately on the line 5—5 of Fig. 3; and Fig. 6 is a horizontal sectional view taken approximately on the line 6—6 of Fig. 3.

It should, of course, be understood that the description and drawings herein are illustrative merely, and that various modifications and changes may be made in the structure disclosed without departing from the spirit of the invention.

Referring now more particularly to the drawings, a fragmentary portion of the head 10 of a metal barrel is shown, which is provided with bung closure consisting of a tubular extension 11, having the upper part 12 thereof shaped in the customary manner to provide for a bayonet connection. The extension 11 has an upper surface 13 for sealing, as hereinafter explained. The extension 11 is normally closed, prior to the application of the tapping device by a closure disk (not shown) seated in a recess 14 in the extension 11.

The beer tapping device includes the customary draft tube 15 for opening the closure in the extension 11.

The barrel tapping device in accordance with the present invention includes a cylindrical sleeve 20 having inwardly extending projections 21 at the lower end thereof adapted for engagement with outwardly extending projections 22 on the extension 11, which together provide a separable bayonet connection. The sleeve 20 encloses the lower end of a lower body portion 24. The body portion 24 has an interior passageway 25, of larger interior diameter than the exterior diameter of the draft tube 15 to provide a fluid passageway.

The body portion 24 has in the interior a downwardly extending rim 26 and an outwardly extending flange 27. The upper face of the flange 27 provides an abutment and the lower face of the flange 27 provides a shoulder. A resilient packing ring 28, preferably of rubber or like material, is inserted in the sleeve 20 and surrounding the rim 26 in engagement with the shoulder of the flange 27. The sealing ring 28 is adapted to be applied in sealing engagement with the upper face 13 of the extension 11, as hereinafter explained.

The sleeve 20 is provided, on each side, with bearing blocks 30, secured to the sleeve 20 by studs 31. Pins 32 are provided in the bearing blocks 30. The inner ends of the pins 32 are slidably received and guided in vertical recesses 33 in the lower body portion 24. The pins 32 have mounted thereon levers 34, the ends 35 of which are cammed and are adapted for engagement with the upper face of the flange 27. The levers 34 have offset portions 36 and are connected at their outer ends by an actuating handle portion 37 for manual actuation. The offset portions 36 and the handle portion 37 may be moved to a position close to the body portion 24 upon upward movement of the handle portion 37. A spring actuated locking pin 38 is provided on one of the levers 34 and is adapted to engage in a locking hole 39 in the body portion 24 for retaining the levers 34 in their upper and compressing position as hereinafter explained.

The upper end of the lower body portion 24 has internal threads 40 for the reception of a complementally threaded end 41 of an upper body portion 42. The interior of the lower body portion 24, adjacent the lower end of the threads 40, is provided with a frusto-conical surface 43 for permitting a limited downward movement of a resilient sealing ring 44, of rubber or the like, the periphery of the ring 44 being held by the shouldered lower end of the upper body portion 42 and the engagement thereof in the upper end of the lower body portion 24. The interior opening in the sealing ring 44 is preferably smaller in diameter than the exterior diameter of the draft tube 15.

The upper body member 42 is provided with an interior passageway 45 of substantially the same diameter as that of the draft tube 15 to permit movement of the draft tube 15 therein as required. The interior passageway 45 is enlarged to provide an annular recess 46 for the reception of a resilient packing ring 47, of rubber or the like, and a compressing collar 48 is provided in the recess 46 above the ring 47.

The upper end of the upper body member 42 is provided on each side thereof with bearing blocks 49 secured in position by studs 50. The bearing blocks 49 carry pins 51 on which levers 52 are mounted. The levers 52 have cammed ends 53 for engagement with the upper face of the compressing collar 48. The other ends of the levers 52 have offset portions 54, and are connected at their outer ends to an actuating handle portion 55 for manual actuation and compression of the packing ring 47. The offset portions 54 and handle portion 55 may be moved to a position close to the body member 42 upon upward movement of the handle portion 55.

The lower body portion 24 is provided with a valved pressure connection 60 for the introduction of air or gas under pressure to the passageway 25 and therethrough to the interior of the barrel 10 for effecting delivery of the contents. The sealing rings 44 and 47 prevent the upward delivery of the air or gas and the sealing ring 28 prevents the escape at the closure extension 11.

The mode of use of the tapping device in accordance with the present invention will now be pointed out.

With the draft tube 15 removed or with the lower end thereof above the closure in the recess 14, and with the handle 37 in the lowered position shown in Fig. 1, the device is positioned with the sleeve 20 in engagement with the extension 11. The handle 37 is then swung upwardly about the pivots provided by the pins 32. The cammed lower end 35 thereof is effective on the upper face of the flange 27 for compressing the packing ring 28 into fluid tight engagement with the end 13 of the extension 11 with the interior wall of the sleeve 20 and with the exterior surface of the tubular rim 26. The levers 34 are then locked in compressing position and close to the body 24 by the engagement of the pin 38 in the hole 39.

The sliding engagement of the inner ends of the pins 32 in the slots 33 prevents undesired relative rotation of the sleeve 20 and body portion 24, but permits relative axial movement for compressing the packing ring 28.

The draft tube 15 may then be inserted in the central opening 45 and 25 and driven downwardly to rupture or displace inwardly the closure in the extension 11, or if the draft tube 15 has previously been positioned in the central openings may be driven downwardly to rupture or displace inwardly the closure. When the draft tube 15 has been inserted in the barrel to the desired extent the handle 55 is then swung downwardly from its vertical position on the pivots provided by the pins 51. The cammed ends 53 of the levers 52 press the collar 48 downwardly into engagement with the sealing ring 47 which is compressed into sealing engagement with the draft tube 15 and the walls of the recess 46.

An air or gas connection may then be connected to the pressure connection 60 and the fluid may then be withdrawn from the barrel through the draft tube 15 in the usual manner.

I claim:

1. In a device for tapping a barrel having a tubular closure member, the combination of a body having a central opening for the reception of a draft tube, means for preventing fluid leakage between said body and said draft tube, a sleeve carried by said body for attachment to said closure member, said body having a flange and a rim extending downwardly within said sleeve and spaced outwardly from said draft tube, a packing ring in engagement with said flange and rim and with said sleeve and adapted to abut against said closure member, and means for compressing said packing ring in fluid tight engagement with said sleeve and said closure, said last means including lever members pivotally mounted on said sleeve.

2. In a device for tapping a barrel having a tubular closure member, the combination of a body having a central opening for the reception of a draft tube, means for preventing fluid leakage between said body and said draft tube, a sleeve movably mounted with respect to said body for engagement with said closure member, said body having a downwardly extending rim within said sleeve spaced outwardly from said draft tube, a packing ring in engagement with said rim and said sleeve and adapted to abut against said closure member, and means for compressing said packing ring in fluid tight engagement with said sleeve and said closure, said last means including a compressing ring in engagement with said packing ring and lever members pivotally mounted on said sleeve for engagement with said compressing ring.

3. In a device for tapping a barrel having a tubular closure member, the combination of a body having a central opening for the reception of a draft tube, means for preventing fluid leakage between said body and said draft tube, a sleeve slidably mounted with respect to said body for engagement with said closure member, a compressing ring extending from said body, said body having a rim extending below said compressing ring within said sleeve and spaced outwardly from said draft tube, a packing ring in engagement with said compressing ring and rim and with said sleeve and adapted to abut against said closure member, and means for compressing said packing ring in fluid tight engagement with said sleeve and said closure, said last means including lever members pivotally mounted on said sleeve and having cammed ends for engagement with said compressing ring.

4. In a device for tapping a barrel having a tubular closure member, a body having a central opening for the reception of a draft tube, means for attaching said body to said closure member including a sleeve movable with respect to said body, a resilient packing ring in said sleeve for engagement with said closure member, a pivotally mounted lever carried by said sleeve having a cammed end for compressing said packing into fluid tight engagement with said closure member and a portion of said body, and means for preventing fluid leakage between said body and said draft tube.

5. In a device for tapping a barrel having a closure member, the combination of a body having a central opening for the reception of a draft tube, means for connecting said body to said closure member in fluid tight relationship, said body having therein a recess surrounding said central opening, a resilient packing ring in said recess for engagement with said draft tube, a compressing collar in engagement with said packing ring, and lever members pivotally mounted on said body and having cammed ends for engagement with said collar for compressing said ring into fluid tight engagement with said body and said draft tube.

6. In a device for tapping a barrel having a closure member, the combination of a body having a central opening for the reception of a draft tube, means carried by said body for holding said draft tube in said opening, the lower portion of said opening being enlarged to provide a fluid passageway, a pressure fluid connection in communication with said passageway, means for connecting said body to said closure member in fluid tight relationship, and a resilient sealing ring at the upper end of said enlargement of said opening having a central hole for said draft tube, and a recess in said enlarged portion to permit of limited displacement of said sealing ring.

7. In a device for tapping a barrel having a closure member, the combination of a body having a central opening for the reception of a draft tube, packing between said body and said draft tube for preventing fluid leakage, the lower portion of said opening being enlarged to provide a fluid passageway, a pressure fluid connection in communication with said passageway, means for connecting said body to said closure member in fluid tight relationship, and a resilient sealing ring at the upper end of said enlargement of said opening having a central bore for said draft tube of smaller diameter than the external diameter of said draft tube.

8. In a device for tapping a barrel having a closure member, the combination of a body having separable portions and a central longitudinal opening for the reception of a draft tube, packing between one of said body portions and said draft tube for preventing fluid leakage, the opening in the other of said body portions being enlarged to provide a fluid passageway, a pressure fluid connection in communication with said passageway, means for connecting the other of said body portions to said closure member in fluid tight relationship, and a resilient sealing ring interposed between said body portions and having a central hole for said draft tube.

ROBERT SWARTLEY.

REFERENCES CITED

The following references are of record in the file of this patent:

UNITED STATES PATENTS

| Number | Name | Date |
|---|---|---|
| 573,867 | Fischer | Dec. 29, 1896 |
| 850,410 | Weatherhead | Apr. 16, 1907 |
| 1,141,269 | Rice | June 1, 1915 |